United States Patent [19]

Reedman et al.

[11] Patent Number: 4,862,377
[45] Date of Patent: Aug. 29, 1989

[54] DETECTING WORKPIECE ORIETATION AND TREATING WORKPIECES WITHOUT REORIETING

[75] Inventors: David C. Reedman, Wartnaby; Clive Preece, High Sincliffe, both of England

[73] Assignee: British United Shoe Machinery Ltd., Leicester, England

[21] Appl. No.: 114,296

[22] Filed: Oct. 28, 1987

[30] Foreign Application Priority Data

Nov. 6, 1986 [GB] United Kingdom .............. 8626499

[51] Int. Cl.$^4$ .................................... G01B 11/00
[52] U.S. Cl. .................................. 364/468; 364/559; 356/378; 356/394
[58] Field of Search ........ 364/468, 474, 475, 167–171, 364/559, 474.09, 513; 382/394 X; 358/101, 107; 356/378 X

[56] References Cited

U.S. PATENT DOCUMENTS

| | | | |
|---|---|---|---|
| 4,370,721 | 1/1983 | Berenberg et al. | 364/474 |
| 4,380,274 | 11/1982 | Norton-Wayne | 356/394 |
| 4,458,961 | 8/1984 | Price et al. | 384/478 |
| 4,630,225 | 12/1986 | Hisano | 364/559 |
| 4,639,878 | 1/1987 | Day et al. | 364/513 |
| 4,647,208 | 3/1987 | Bieman | 358/101 |
| 4,707,647 | 11/1987 | Coldren et al. | 364/478 |
| 4,715,772 | 12/1987 | Kanayama | 364/478 |
| 4,736,325 | 4/1988 | Nagae et al. | 384/474 |

FOREIGN PATENT DOCUMENTS

| | | |
|---|---|---|
| 2110427 | 6/1983 | United Kingdom . |
| 01131 | 3/1985 | World Int. Prop. O. . |

*Primary Examiner*—Allen MacDonald
*Attorney, Agent, or Firm*—Owen J. Meegar; Aubrey C. Brine

[57] ABSTRACT

A system for identifying workpieces by scanning them and "reading" details of their configuration is adapted for applying a desired pattern of material in liquid form (e.g. ink) or in powder form (e.g. toner material or a hot melt adhesive) to the workpieces regardless of their location and orientation on a workpiece support (18, 118). This is achieved by the pattern data (relating to the desired pattern) selected from a store being modified in accordance with positional data (relating to the location and orientation obtained during scanning FIG. 2). When the applied material is liquid and dispensed from such as a suitable tool such as a pen (152) or other liquid applicator. When the ink is in powder form, a suitable tool is an electrostatic printer (36) e.g. an ionographic printer.

25 Claims, 2 Drawing Sheets

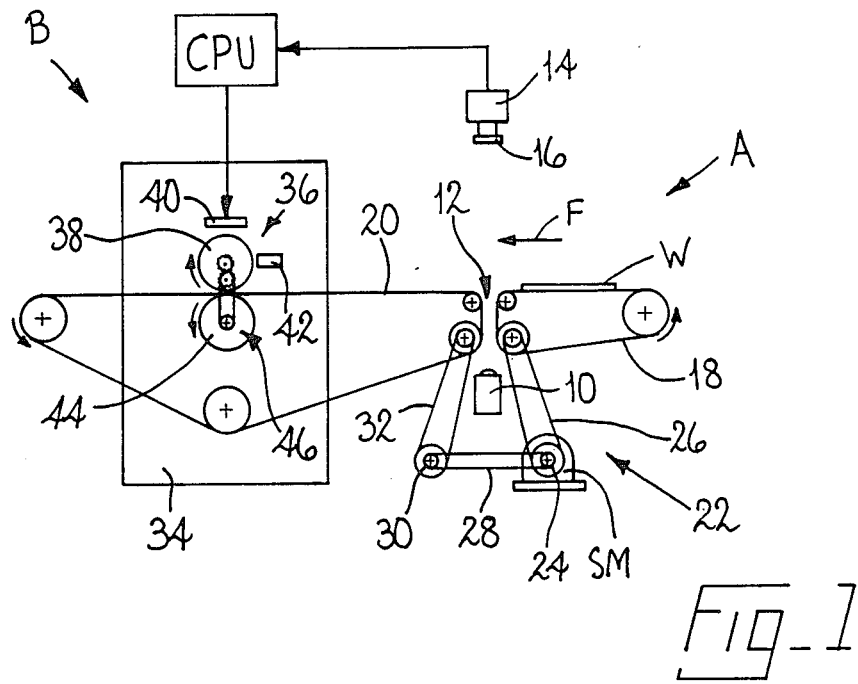
Fig_1
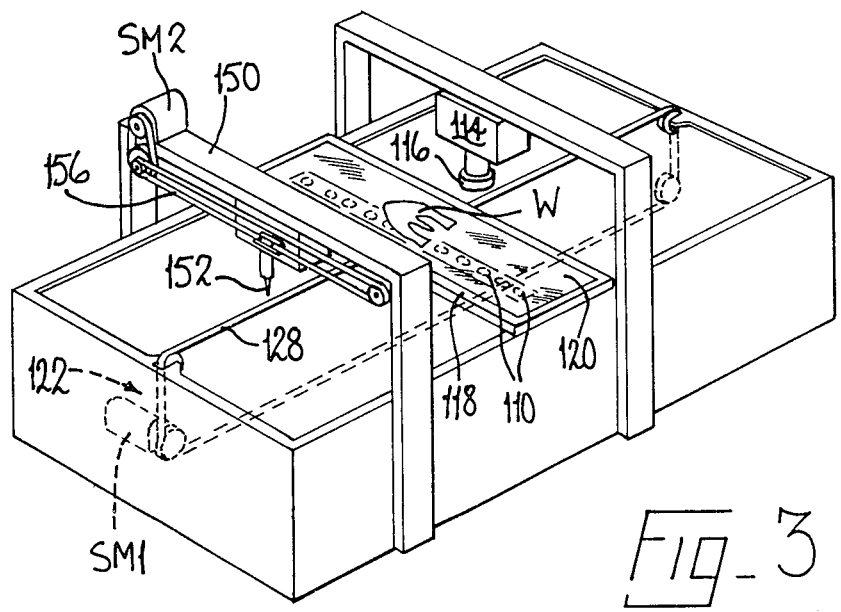
Fig_3

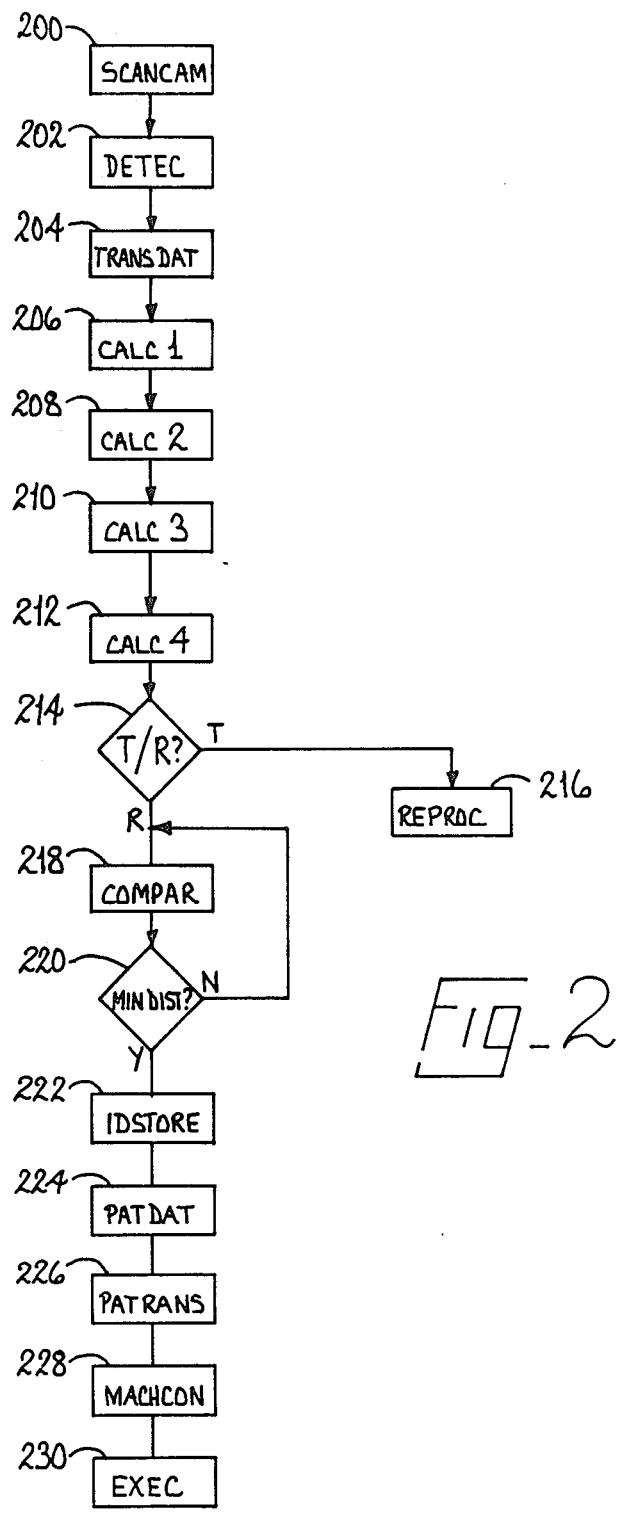
Fig_2

DETECTING WORKPIECE ORIETATION AND TREATING WORKPIECES WITHOUT REORIETING

BACKGROUND OF THE INVENTION

This invention is concerned with methods of and apparatus for treating workpieces at a desired location thereof and in accordance with a desired pattern. One example of such treatment involves the surface treatment of a shoe upper component to apply a stitch-marking or a decorative or purposive pattern thereto. In another example, adhesive may be applied to the workpiece. An example of the apparatus is an apparatus for effecting a progressive surface treatment on workpieces, e.g. a printing apparatus.

Where workpieces are to be treated, it is customarily necessary for them to be located in a desired position in relation to the operating tool and also in the correct orientation in such position. To this end, it has been proposed, where the workpieces are fed in a random orientation, to re-orientate them correctly and locate them at a desired position prior to feeding them to an operating tool: see e.g. U.S. Pat. No. 3,356,237. Using such an apparatus, however, there are on the degree of mis-orientation of the workpiece which can be accommodated, while still allowing the workpiece to be properly presented to the operating tool.

OBJECTS OF THE INVENTION

It is an object of the present invention to provide an improved method of treating workpieces at a desired location thereof and in accordance with a desired pattern, wherein the need for any re-orientation is dispensed with prior to presentation to the operating tool.

It is a further object of the present invention to provide an improved apparatus for effecting a printing operation (or other treatment) on a workpiece at a desired locality, regardless of the location and orientation of the workpiece.

SUMMARY OF THE INVENTION

The invention thus provides, in one of its several aspects, methods of treating workpieces at a desired locality thereof and in accordance with a desired pattern, wherein pattern data relating to the desired pattern is stored in a computer memory, such data being used to control the operation of an operating tool on each workpiece presented thereto. In carrying out the method, workpieces are randomly located and randomly oriented on a support are successively scanned whereby position all data relating to the location and orientation of each such workpiece is obtained using a computer by which workpiece shape data obtained by such scanning and taught workpiece shape data stored in the computer memory are compared and the orientation of each such workpiece is calculated on the basis of the comparison.

The stored pattern data is modified for each such workpiece utilising the positional data obtained as aforesaid in respect of such workpiece.

The thus modified pattern data is used to cause the operating tool to operate in accordance with the desired pattern and at the desired locality of the workpiece, when the latter is presented thereto.

It will be appreciated that in using the above method the orientation and location of the workpiece can be accommodated without limitation by the modification within the computer of the pattern data in accordance with the computer-generated positional data obtained.

For obtaining the positional data, conveniently an apparatus as described in U.S. Pat. No. 4,360,274 may be used, in which taught workpiece shape data relating to a plurality of different workpiece shapes and size and pattern data relating to a plurality of different patterns are stored in the computer memory, one pattern being associated with each workpiece and the appropriate workpiece shape and pattern data being associated accordingly. In carrying out the method of the present invention, furthermore, conveniently the workpiece shape data obtained by scanning as aforesaid is utilised to identify the workpiece by comparison with the taught workpiece shape data, and the operating tool is caused to operate as aforesaid under the control of the pattern data associated with the compared taught workpiece shape data but modified as aforesaid utilising the positional data for the workpiece.

It will thus be appreciated that, using this method, workpieces of different shapes and sizes can be placed at random on a support and be identified, whereafter they can be presented to an operating tool for an operation to be performed thereon at a desired locality, without interference by an operator and regardless of the location and orientation of the workpiece.

In one embodiment of the invention, wherein the tool is of the type which operates progressively on a workpiece, relative movement takes place between the tool and the support for effecting such progressive operation along a path corresponding to the desired pattern; more particularly, in this embodiment the support is movable forwardly and rearwardly in one direction and the tool is movable forwardly and rearwardly in a direction extending tranversely of said one direction.

The tool may be omni-directional or uni-directional; in the latter case, conveniently the tool is mounted for rotation about an axis extending normally to the two aforementioned directions of movement of the supporting tool, so as to maintain the tool in the correct orientation in relation to the workpiece during its operation. Conveniently also the control of rotation is effected under control of the computer in accordance with the pattern data.

In the embodiment referred to above the positional data relating to the location and orientation of the workpiece is thus used to modify the pattern data by which the path along which the operating tool operates is modified, without the need for any re-orientation of the workpiece itself.

One example of such a method is the application of a stitch-making to a shoe upper component using an omni-directional stitch-marking pen.

The invention also provides, in another of its several aspects, a method of applying a stitch-marking to a shoe upper component at a desired location on a surface thereof. The method comprises storing in a computer memory pattern data relating to the pattern in accordance with which the stitch-marking is to be applied to the component surface. The component is placed on a support and positional data relating to the location and orientation of the component on the support, is obtained. The positional data is utilized to modify the pattern data, and effect relative movement between the support and a stitch-marking tool under the control of the modified pattern data whereby the tool effects a progressive stitch-marking operation on the component surface, wherein the modification of the pattern data utilising the positional data is such that the stitch-marking is applied to the desired location on the component surface regardless of the location and orientation of the component on the support.

One example of an omni-directional operating tool (i.e. a tool not requiring rotation) is a stitch-marking pen by which a pattern is drawn in ink on the workpiece surface. An example of a uni-directional operating tool (i.e. a tool which does require rotation) is an adhesive-applying nozzle of the type described in U.S. Pat. No. 4,419,393 by which a band of adhesive is applied to the workpiece surface.

In a further embodiment of the invention, the tool is constituted by an electrostatic printing device comprising a conductive member with a dielectric coating forming a printing surface which extends across the width of the support whereby the workpiece on the support can be positioned in an operative relationship with the printing surface regardless of the location of the workpiece on the support. Moreover, in carrying out such a method, under the control of the modified pattern data material in powder form, e.g. toner material is deposited on the printing surface in a pattern corresponding to the desired pattern and at a location which, when the printing surface engages the workpiece, corresponds to the desired location on the latter. In this embodiment, the conductive member is conveniently in the form of a roller which is caused to rotate in timed relation with advancing movement of the support. Furthermore, depending upon the type of electrostatic printer used pressure and/or heat may be applied to the workpiece as it is carried past the roller by the support.

Whichever type of printer is used, it will be appreciated that in this case also the printing operation takes place on the workpiece without any need for re-orienting it.

The invention further provides, in another of its several aspects, a method of printing a desired pattern on a workpiece surface at a desired locality thereof, using an operating tool constituted by an electrostatic printing device comprising a conductive member with a dielectric coating forming a printing surface, wherein pattern data relating to the desired pattern is stored in a computer memory and is utilised for controlling the printing of the pattern by the operating tool while the workpiece is supported on a support across the width of which the printing surface extends, whereby the workpiece on the support can be positioned in an operative relationship with the printing surface regardless of the location of the workpiece on the support, said method comprising the steps of obtaining positional data relating to the location and orientation of the workpieces on the support, and utilising the positional data to modify the pattern data such that, under the control of the modified pattern data, material in powder form is deposited on the printing surface in a pattern corresponding to the desired pattern and at a locality thereof which, when the printing surface engages the workpiece, corresponds to the desired locality on the latter, whereby the tool is caused to operate at the desired locality on the workpiece regardless of the location and orientation of the workpiece on the support.

The electrostatic printing device used in carrying out a method as aforesaid may be of the xerographic type, but preferably comprises means for generating ions and forming them into a pattern on the printing surface under the control of the modified pattern data, the material in powder form, in this case toner material, being deposited on the printing surface in accordance with said pattern of ions; such a printing device is usually referred to as an ionographic printing device. Whereas the material in powder form is in this case toner material, it will be appreciated that adhesive in powder form could also be "printed" in this manner.

The methods in accordance with the invention referred to hereinbefore are suitably effected in combination with so-called pattern identification techniques, wherein the positional data is obtained by scanning the workpiece and thereby identifying it, using a computer which has been taught a plurality of workpiece shapes and comprises a store of data relevant thereto, and calculating the orientation of the workpiece on the support utilising such stored data. More particularly, preferably the workpiece is identified by compiling dimensional data from signals generated by scanning the workpiece and comparing such data with stored dimensional data for workpieces of known configuration, and wherein stored pattern data is associated with the stored dimensional data for each workpiece of known configuration, the associated pattern data to be utilised for a given workpiece being selected according to its identification.

For effecting such pattern identification (or pattern recognition), an apparatus may be used as is described in U.S. Pat. No. 4,360,274, which apparatus comprises a workpiece support, a scanning device, means for effecting relative movement between the scanning device and the workpiece support whereby a workpiece supported by the workpiece support is scanned by the scanning device, and compiling means responsive to signals emitted by the scanning device for compiling positional data relating to both the location and the orientation of the workpiece on the workpiece support.

For adapting said apparatus to carrying out a method as set out above, data storage means of said apparatus, which is utilised for storing the positional data, is also utilised for storing pattern data relating to the desired surface treatment pattern, and the apparatus also comprises an arrangement by which the pattern data is modified using the positional data and the movement of a surface treatment tool of the apparatus is controlled in accordance with the modified data.

The invention thus provides, in another of its several aspects, apparatus for effecting a progressive surface treatment on workpieces at a desired location thereof and in accordance with a desired pattern, comprising a workpiece support, a scanning device, means for effecting relative movement between the scanning device and the workpiece support whereby a workpiece supported by the workpiece support is scanned by the scanning device, compiling means responsive to signals emitted by the scanning device for compiling positional data relating to both the location and the orientation of the workpiece on the workpiece support, data storage means for storing the positional data and also pattern data relating to the desired surface treatment pattern, data modifying means whereby the pattern data is modified using the positional data, a surface treatment tool, and means for effecting relative movement between the tool and the workpiece support whereby the tool is caused to operate progressively on the workpiece surface in accordance with the desired pattern, said last-mentioned means being operable under the control of the modified pattern data whereby the tool is caused to operate as aforesaid at the desired location on the workpiece surface.

The invention further provides, in yet another of its various aspects, apparatus for effecting a printing operation on a workpiece at a desired location on the workpiece surface and in accordance with a desired pattern, comprising a workpiece support, a scanning device, means for effecting relative movement between the scanning device and the workpiece support whereby a workpiece supported by the workpiece support is scanned by the scanning device, compiling means responsive to signals emitted by the scanning device for compiling positional data relating to both the location and the orientation of the workpiece on the workpiece support are obtained, data storage means for storing the positional data and also pattern data relating to the desired surface treatment pattern, data modifying means whereby the pattern data is modified using the positional data, an electrostatic printing device comprising a conductive member with a dielectric coating forming a printing surface which extends across the width of the support, pattern locating means for determining, in accordance with the modified pattern data, a location on the printing surface which, when the printing surface engages the workpiece surface, corresponds to the desired location on the workpiece surface, and depositing means whereby material in powder form is applied, in accordance with the modified data, to said location on the printing surface, and means for effecting relative movement between the printing surface and the workpiece support whereby the surface of a workpiece on said support and the printing surface are brought into an operative relationship for a printing operation to be performed at the desired location on the workpiece surface.

For assisting in the retrieval of data from the data storage means and also the matching of pattern data with positional data as aforesaid, conveniently the data storage means comprises a first permanent store of dimensional data relating to workpieces of different configuration and also a second permanent store of pattern data relating to different patterns to be followed, selected pattern data from the second store being associated with the dimensional data for each such workpiece, and the compiling means also compiles dimensional data relating to the workpiece scanned by the scanning device, the apparatus further comprising comparator means for comparing the compiled dimensional data with the data in the first permanent store thus to identify the scanned workpiece, and selector means for selecting from the second permanent store the pattern data associated with the workpiece as identified.

BRIEF DESCRIPTION OF THE DRAWINGS

There now follows a detailed description, to be read with reference to the accompanying drawings, of two methods and two apparatuses in accordance with the invention. It will be appreciated that these methods and apparatuses have been selected for description merely by way of non-limiting example of the invention.

In the accompanying drawings:

FIG. 1 is a schematic view indicating the lay-out of a first apparatus in accordance with the invention;

FIG. 2 is a flowchart setting out schematically the soft controlling each method in accordance with the invention; and FIG. 3 is a perspective view of a second apparatus in accordance with the invention.

DESCRIPTION OF THE PREFERRED EMBODIMENTS

The first apparatus in accordance with the invention (FIG. 1) comprises a pattern recognition system located at a pattern recognition station generally designated A and a printing apparatus located at a printing station generally designated B, both being controlled by a central processor unit CPU. The pattern recognition system is generally similar except as hereinafter described, to the system described in U.S. Pat. No. 4,360,274 and comprises two conveyor belts 18, 20 between which is a narrow gap 12 which can be bridged by a workpiece W being fed in the direction of the arrow F through the stations A, B. Aligned with the gap 12, beneath the conveyor belts 18, 20, is an array of filament lamps 10, while disposed in opposed relationship with said lamps, above the level of the workpiece-carrying surfaces of the belts 18, 20, is an array of light detectors 14 arranged to receive light emitted by the lamps 10 and focussed onto the detectors by a high-resolution lens 16; the array 14 and lens 16 are generally referred to as a "camera". It will thus be appreciated that the optical paths of the light will be interrupted upon the passage of a workpiece across the gap 12, the advancing movement of the workpiece being progressive whereby the workpiece is "scanned" by the array 14 as it is fed.

For moving the conveyor belts 18, 20 a numerically controlled motor drive system generally designated 22 is provided. The system 22 typically comprises a stepping motor SM having an output shaft 24 carrying a pulley which is connected by a timing belt 26 with a corresponding pulley on a shaft supporting the drive pulleys for the conveyor belt 18. Similarly, a timing belt 28 connects the output shaft 30, itself connected by a timing belt 32 to a drive pulley associated with the conveyor belt 20. In this way, the two conveyor belts 18, 20 are driven synchronously under the stepping motor control. The stepping motor SM is controlled by the CPU. The CPU is also operable, after each unit distance of movement, to record which of the array of detectors 14 has detected a workpiece as aforesaid. The unit distance is typically in the order of 300 microns.

The printing station B is arranged "downstream" of the gap 12 (viewed along the direction F), the conveyor belt 20 passing through the printer station B and out at the opposite side. Arranged in a suitable cabinet 34 at the printing station B is a printer generally designated 36 of the electrostatic type, more particularly an ionographic printing device. Such a device is generally similar, except as hereinafter described, to the apparatus described in U.S. Pat. No. 4,267,556 and comprises a print roller 38 which is coated with a suitable dielectric material, a charging head 40 by means of which a latent electrostatic image, in a desired pattern, is provided on the dielectric layer and toner applying means, including a toner applicator head 42 by which charged, coloured particulate material is applied to the latent image. The print roller 38 is arranged above the workpiece-supporting surface of the belt 20 such that a workpiece supported by said surface is engaged by the print roler. For applying suitable pressure to the workpiece to effect the transfer of the toner material, a further, presser, roller 44 is provided, this latter roller being desirably coated with a thermoplastic material. The two rollers 38, 44 are synchronously driven using a gear and timing belt drive arrangement generally designated 46, so that they rotate in contrary directions, and further the drive arrangement 46 is itself connected to the drive arrangement 22 in such a manner (not shown) that the two rollers 38, 44 rotate at a peripheral speed which matches that of the conveyor belt 20.

In the operation of this apparatus, in carrying out a first of the methods in accordance with the invention, a workpiece W is placed on the conveyor belt 18 in any orientation and is advanced across the gap 12 onto the upper reach of the belt 20, the camera 14, 16 being effective to scan the workpiece as it crosses the gap and thereby identify it. As described in detail in U.S. Pat. No 4,360,274 the camera is connected to the CPU the data storage means of which comprises a first permanent store of dimensional data relating to workpieces of different configuration, and which also comprises comparator means for comparing compiled dimensional data for the particular workpiece with the data in the first permanent store. The CPU, in identifying a workpiece, also determines, from the signals from the camera 14, 16, positional data relating to both the location of the workpiece on the conveyor belt and further the orientation of the workpiece. Thus, when the workpiece has reached the conveyor belt 20, both its identity and also its location and orientation on the belt 20 are "known".

The data storage means of the CPU also comprises a second permanent store of pattern data relating to different desired patterns which are to be applied to workpieces being treated in the apparatus. Furthermore, the data storage means also identifies to which workpiece configuration any given pattern whose pattern data is thus stored is to be applied. Thus, when a workpiece of a given configuration is identified as aforesaid, selector means in the CPU is effective to select its associated pattern data from the second permanent store.

The pattern data selected is then processed by the CPU according to the location and orientation of the workpiece using data modifying means forming part of the CPU and appropriate signals are then supplied by the CPU to the charging head 40 of the printing device 36 in accordance with the modified pattern data. The latent image is then formed on the surface of the dielectric layer on the print roller 38, at a location on said surface which, when the surface engages the workpiece surface to be printed, corresponds to the desired location on the workpiece surface. The latent image is then toned, as described in U.S. Pat. No. 4,267,556, and the toned image is then pressed against the workpiece surface to effect a printing operation thereon.

Whereas in using an ionographic printer, it is necessary to apply pressure to the pattern of the toner material, in other electrostatic printers, e.g. laser printers and xerographic printers, it is desirable to apply heat.

FIG. 2 is a flowchart setting out in more detail a preferred method in accordance with the invention for effecting shape recognition and for controlling the print operation. At step 200 the workpiece W placed on the conveyor belt 18 is passed across the gap 12 as aforesaid and scanned using the camera 14, 16. The camera, at step 202, effects an edge detection process using 3×3 convolution techniques. That is to say, the region scanned is sub-divided into nine pixels and each pixel is scanned as to whether it is registering light detection, a "0" signal, or no light, a "1" signal. Where there is a "1", then the adjacent pixels are scanned for further "1" signals, which would indicate the presence of an edge. In this way the edge configuration of the workpiece is built up as the workpiece progresses through the gap 12. At step 204 the edge points are passed to the CPU. From this information the CPU calculates various characteristics of the workpiece (step 206). In particular, the area is calculated by summing all the "1" signals (sigma a). In addition, the first moment of area is calculated (sigma ax, sigma ay) with respect to an arbitrary datum and from this information the location of the centroid is calculated:

$$x = \frac{\text{sigma } ax}{\text{sigma } a}, y = \frac{\text{sigma } ay}{\text{sigma } y}.$$

Also at this stage second moments of area are calculated (sigma ax$^2$, sigma ay$^2$, sigma axy). At step 208, using the parallel axis theorem, second moments of area are then calculated about the centroid. As a further calculation, at step 210 the orientation of the principal axes, about which the second moments of area have minimum and maximum values respectively, are calculated. It will of course be appreciated that the orientation of the axes is ambiguous in so far as they are capable of two positions which differ by 180°. To overcome this, also in this step the longest s the major axis is established and this is the final part of determining the orientation of the workpiece unambiguously. As a final part of the calculation, at step 212 the furthest edge point along each of a number of equispaced radii emanating from the centroid is determined and in each case the square of the distance along the radius is used as a "candidate" feature, i.e. a feature of the set of information which subsequently will be used to identify the workpiece.

Up to this stage, the apparatus operates in the same manner whether the workpiece configuration (shape) is being "taught" or whether the workpiece is being "recognised". At step 214 this question is asked. If the reply is "Taught" then at step 216 the whole of the database is reprocessed adding the new data and re-calculating the feature sets stored for each workpiece in order to ensure that each remains unique. This calculation is based upon the "minimum distance" feature set out in GB-A No. 2067326.

If the answer at step 214 is "Recognised", then at step 218 the dimensional data thus obtained as aforesaid is compared feature by feature with the data stored in the first permanent store of the data storage means of the CPU. In order to limit the search, the first comparison is one of area. At step 220 the question is posed whether there are sufficient identical features between the workpiece and the compared data to satisfy the minimum distance requirements. If the answer is "No", then step 218 is returned to for further features to be compared, and this process continues until the identity of the workpiece is established. At the same time the positional data relating to the identified workpiece is determined and stored (step 222). More particularly, the location of the centroid is stored and also the orientation of the principal axes calculated at step 210. The selecting means of the computer control means is then effective to select from the second permanent store of the data storage means the pattern data which is associated with the dimensional data in the first permanent store (step 224).

At this stage the workpiece W is advancing to the printing station B. It is of course important also at this stage to ensure that the workpiece does not lose registration in terms of its location on the conveyor belt 20 and its orientation. To this end, therefore, the belt 20 may be perforated and pass over a suction chamber whereby the workpiece W is maintained in position on the workpiece-supporting surface of the belt.

The pattern data in the data storage means is in the form of a set of x and y coordinates, which are related to a datum, said relationship reflecting the relationship between the centroid to which the pattern is to be applied and the position of such pattern in relation to the centroid. At step 226 transformation is applied to the pattern data in accordance with the stored data relating to the location and orientation of the workpiece on the workpiece-supporting surface of the conveyor belt 20. The transformed (modified) data is then passed at step 228 to a controller which controls the operation of the electrostatic printing device 36. The controller then executes the printing operation (step 230), that is to say, the data is utilised to form on the dielectric layer providing the surface of the print roller 38 a latent electrostatic image corresponding to the desired pattern at a location which is so arranged that it corresponds to the location and orientation of the workpiece on the workpiece-supporting surface, whereby, as the workpiece is advanced and the print roller is rotated, the latent image picks up toner material and applies it to the workpiece surface at the desired locality thereof.

It will thus be appreciated that, in carrying out said first method in accordance with the invention, the positional data which is obtained relating to the location and orientation of the workpiece, which has been identified as aforesaid, is utilised to modify the pattern data which has been selected for application to such identified workpiece, and the operating tool, in this case the print roller, is caused to operate at the desired location on the workpiece surface regardless of the location and orientation of the workpiece on the workpiece-supporting surface. It will of course be appreciated that the pattern which is printed on the workpiece surface may be for decorative or other purposes. One non-decorative example would be stitch-marking, that is to say marking on the surface of the workpiece (constituted e.g. by a shoe upper component) a marking, e.g. a delible line marking, which serves to locate a further workpiece in relation to the printed workpiece prior to securing the two together by stitching. Alternatively, instead of toner material, adhesive, e.g. hot melt adhesive, in powder material may be applied using the foregoing method.

The second apparatus in accordance with the invention is illustrated in FIG. 3 and more particularly is concerned with the stitch-marking of shoe upper components. The second apparatus, which is generally similar, except as hereinafter described, to the apparatus described in U.S. Pat. No. 4,360,274, thus comprises a table 118 for supporting a workpiece and having a transparent cover 120. The table 118 is movable along a path between a light source, in the form of a line of filament lamps 110, and an array of light detectors 114 arranged to receive light emitted by the lamps, the light being focussed onto the detectors by a high resolution lens 116. For moving the table 118 a suitable numerically controlled drive arrangement 122 is provided, comprising a stepping motor SM1 which is connected by a timing belt 128 to the table 118. By operation of the arrangement 122 the table 118 is caused to move step-by-step between the light source and the array 114 whereby a workpiece W supported thereon is "scanned".

"Downstream" of the array 114 of light detectors is arranged a marking station comprising a bridge member 150 on which a stitch-marking pen 152 is movable along a path extending perpendicularly transversely of the path of movement of the table 118. For moving the pen 152 thus transversely, a further numerically controlled drive arrangement 154 is provided, comprising a stepping motor SM2 operatively connected by a timing belt 156 to the pen. The pen 152 incorporates any suitable ink supply arrangement (not shown).

In the operation of the second apparatus in accordance with the invention a workpiece is first scanned and thereby identified and its location and orientation on the table 118 is established. Thereafter, the table moves to the marking station at which, by cooperation between the stepping motors SM1, SM2, the pen 152 is caused to follow a desired pattern in accordance with pattern data stored in the second permanent store of the data storage means of the computer control and selected therefrom in accordance with the identity of the workpiece W as determined from the first permanent store of said data storage means.

In carrying out the second of the methods in accordance with the invention, using the second apparatus, essentially the same software is used as with the first method. Thus, steps 200 to 228 are identical in carrying out both methods. In executing the marking operation in the case of the second method, however, the X and Y data to which the transformation has been applied is utilised to effect both movement of the table 118 longitudinally (X axis) and also transverse movement of the pen 152 (Y axis) in order to apply the desired pattern to the workpiece.

Whereas the second method is specifically described in terms of stitch-marking, it will of course be appreciated that such a system could also be used for other printing operations, e.g. decorative operations. Instead of a pen, a uni-directional applicator, e.g. an adhesive-applying nozzle of the type described in U.S. Pat. No. 4,419,393 could be used for applying a pattern of adhesive to the workpiece. In this case it will be necessary also to provide for rotation of the nozzle about an axis extending heightwise of the table 118 so that the nozzle is correctly oriented in accordance with its direction of travel relative to the workpiece at any given time. The rotational data thus forms part of the pattern data and is appropriately modified according to the location and orientation of the workpiece on the table 118.

It will be appreciated that while the two methods disclosed, and the apparatus for carrying them out, are related to printing operations, in its broader aspects the invention is generally applicable to a plurality of operations, e.g. sewing, cutting, punching and the like. In addition the invention should not be considered to be restricted to the treatment of shoe upper components, but rather to any suitable workpieces.

We claim:

1. A method of treating work pieces at a desired locality and in accordance with a desired pattern, data for the desired pattern being stored in a computer memory, said data being used to control the operation of an operating tool on each work piece presented to said tool, said method comprising:

supporting work pieces in random location and orientation on a support;

successively scanning said work pieces to obtain positional data relating to the location and orientation of each such work piece;

processing the positional data with a computer by which work piece shape data obtained by such scanning and taught work piece shape data stored in the computer memory are compared and the orientation of each such work piece is calculated on the basis of the comparison;

modifying the stored pattern data for each such work piece and utilizing the positional data obtained as aforesaid in respect of such work piece; and using the modified pattern data to cause the operating tool to operate in accordance with the desired pattern and at the desired locality of the work piece when said work pieces is presented to said tool.

2. Method according to claim 1 wherein the tool is constituted by a stitch-marking pen.

3. The method according to claim 1 further including storing in the computer memory said taught work piece shape data relating to a plurality of different work piece shapes and sizes and pattern data relating to a plurality of different patterns, one pattern being associated with each work piece and the appropriate work piece shape and pattern data being associated accordingly;

scanning the work piece to identify the work piece by comparison with taught work piece shape data; and operating said operating tool under the control of the pattern data associated with the compared taught work piece shape data, said taught work piece shape data being modified to utilize the positional data for the work piece.

4. The method according to claim 1 further including operating the operating tool progressively on the work piece by relative movement between the work piece and the tool, said relative movement taking place along orthogonal axes.

5. The method according to claim 4 wherein said operating tool is unidirectional tool mounted for rotation, said tool being maintained in the correct orientation in relation to the work piece during its operation.

6. Method according to claim 5 wherein the tool is constituted by a unidirectional adhesive-applying nozzle.

7. Method according to claim 1 wherein the tool is constituted by an electrostatic printing device comprising a conductive member with a dielectric coating forming a printing surface which extends across the width of the support wherein the workpiece on the support can be positioned in an operative relationship with the printing surface regardless of the location of the workpiece on the support, and wherein under the control of the modified pattern data material in powder form is deposited on the printing surface in a pattern corresponding to the desired pattern and at a location which, when the printing surface engages the workpiece, corresponds to the desired location on the latter.

8. A method according to claim 7 wherein the conductive member is in the form of a roller which is caused to rotate in timed relation with advancing movement of the support.

9. A method according to claim 8 wherein pressure is applied to the workpiece as it is carried past the roller by the support.

10. A method according to claim 8 wherein heat is applied to the workpiece as it is carried past the roller by the support.

11. A method of applying a stitch marking to a shoe upper component at a desired location on a surface thereof, said method comprising:

storing in a computer memory pattern data relating to the pattern in accordance with which the stitch-marking is to be applied to the component surface;

placing the component on a support;

obtaining positional data relating to the location and orientation of the component on the support;

utilizing the positional data to modify the pattern data; and effecting relative movement between said support and a stitch-marking tool under the control of the modified pattern data; and progressively stitch-marking on the component surface based on the modification of the pattern data utilizing the positional data, the positional data being such that the stitch-marking is applied to the desired location on the component surface regardless of the location and orientation of the component on the support.

12. A method of printing a desired pattern on a work piece in a desired location using an operating tool constituted by an electrostatic printing device which comprises a conductive member with a dielectric coating forming a printing surface, said method further including storing pattern data relating to the desired pattern in a computer memory and utilizing said pattern data for controlling the printing of the pattern by the operating tool while the work piece is supported on a support across the width of which the printing surface extends, said work piece on the support being positionable in an operative relationship with the printing surface regardless of the location of the work piece on the support, said method comprising:

obtaining positional data relating to the location and orientation of the work pieces on the support;

utilizing the positional data to modify the pattern data;

depositing material in powder form on the printing surface under the control of the modified pattern data, said deposition corresponding to the desired pattern and on a location which corresponds to the desired locality on the work piece whereby the tool is caused to operate at a desired locality of the work piece regardless of the location and orientation of the work piece on the support.

13. A method according to claim 12 further including generating ions on the printing surface and forming said ions into a pattern under the control of the modified pattern data; and depositing material in powder form on the printing surface in accordance with said pattern of ions.

14. The method according to claim 12 including the step of scanning the work piece to identify it;

comparing in a computer containing stored data of a plurality of work piece shapes and the identification obtained by scanning; and calculating the orientation of the work piece on the support utilizing such stored data.

15. A method according to claim 12 wherein the material in powder form is constituted by toner material.

16. A method according to claim 12 wherein the workpiece is identified by compiling dimensional data from signals generated by scanning the workpiece and comparing such data with stored dimensional data for workpieces of known shape, and wherein stored pattern data is associated with the stored dimensional data for each workpiece of known shape, the associated pattern data to be utilised for a given workpiece being selected according to its identification.

17. A method according to claim 12 wherein the material is powder form is constituted by a hot melt adhesive.

18. Apparatus for effecting progressive surface treatment on work pieces at a desired location and in accordance with a desired pattern, comprising:
a work piece support;
a scanning device;
means for effecting relative movement between the scanning device and the work piece support to scan the work piece supported by the work piece support with the scanning device;
compiling means responsive to signals emitted by the scanning device for coupling positional data relating to both location and the orientation of the work piece on the work piece support;
data storage means for storing the positional data and also pattern data relating to the desired surface treatment pattern;
data modifying means for modifying the pattern data using the positional data;
a surface treatment tool; and
means for effecting relative movement between the tool and the work piece support for causing the tool to operate progressively on the work piece surface in accordance with the desired pattern, said last mentioned means being operable under the control of the modified pattern data;
means for causing the tool to operate as aforesaid at the desired location on the work piece surface.

19. Apparatus according to claim 18 wherein the data storage means comprises a first permanent store of dimensional data relating to workpieces of different configuration and also a second permanent store of pattern data relating to different patterns to be followed, selected pattern data from the second store being associated with the dimensional data for each such workpiece, and wherein the compiling means also compiles dimensional data relating to the workpiece scanned by the scanning device, the apparatus further comprising
comparator means for comparing the compiled dimensional data with the data in the first permanent store thus to identify the scanned workpiece, and
selector means for selecting from the second permanent store the pattern data associated with the workpiece as identified.

20. Apparatus for effecting a printing operation on a work piece at a desired location on the work piece surface and in accordance with a desired pattern, comprising:
a work piece support;
a scanning device;
means for effecting relative movement between the scanning device and the work piece support to scan the work piece disposed on the work piece support by the scanning device;
compiling means responsive to signals emitted by the scanning device for compiling positional data relating to both the location and the orientation of the work piece on the work piece support, said apparatus being characterized by data storage means for storing the positional data and also pattern data relating to the desired surface treatment pattern;
data modifying means for modifying the pattern data using the positional data;
an electrostatic printing device comprising a conductive member with a dielectric coating forming a printing surface which extends across the width of the support;
pattern locating means for determining in accordance with the modified pattern data, a location on the printing surface which, when the printing surface engages the work piece surface; corresponds to the desired location of the work piece surface,
depositing means for depositing material in powder form in accordance with the modified data to said location on the printing surface; and
means for effecting relative movement between the printing surface and the work piece support to bring into operative relationship the surface of a work piece on said support and the printing surface for a printing operation to be performed at the desired location on the work piece surface.

21. The apparatus according to claim 20 wherein the work piece support is movable along a path to carry a work piece supported thereby past the scanning device and the electrostatic printing device, said conductive member of said device being a roller which rotates in timed relation with the advancing movement of the support.

22. Apparatus according to claim 20 wherein the printing device comprises means for generating ions and forming them into a pattern on the printing surface under the control of the modified pattern data, and means for depositing the material in powder form on the printing surface, the powder being thus deposited in accordance with said pattern of ions.

23. Apparatus according to claim 20 wherein the data storage means comprises a first permanent store of dimensional data relating to workpieces of different configuration and also a second permanent store of pattern data relating to different patterns to be followed, selected pattern data from the second store being associated with the dimensional data for each such workpiece, and wherein the compiling means also compiles dimensional data relating to the workpiece scanned by the scanning device, the apparatus further comprising
comparator means for comparing the compiled dimensional data with the data in the first permanent store thus to identify the scanned workpiece, and
selector means for selecting from the second permanent store the pattern data associated with the workpiece as identified.

24. A method of applying decorative or purposive patterns to a shoe upper component at a desired location on a surface thereof using an electrostatic printing device, comprising the steps of
storing in a computer memory pattern data relating to the pattern to be applied to the component surface,
placing the component on a support,
obtaining positional data relating to the location and orientation of the component on the support,
utilising the positional data to modify the pattern data,
forming on a printing surface of the printing device a deposit of material in powder form in a pattern corresponding to the pattern to be applied to the component surface and at a location on the printing surface which, when the latter surface engages the component surface, corresponds to the desired location on the latter, said pattern and its location on the printing surface being determined by the pattern data as modified utilising the positional data, and bringing the component and the tool into an operative relationship in which the pattern of material in powder form is transferred on to the component surface at the desired location.

25. A method according to claim 24 further including generating ions on the printing surface and forming said ions into a pattern under the control of the modified pattern data; and depositing material in powder form on the printing surface in accordance with said pattern of ions.

* * * * *